(12) United States Patent
Shin et al.

(10) Patent No.: US 7,573,783 B2
(45) Date of Patent: Aug. 11, 2009

(54) METHOD FOR SETTING ALARM IN MOBILE COMMUNICATION TERMINAL

(75) Inventors: Hyun-Kyung Shin, Seoul (KR); Byeong-Cheol Hwang, Seoul (KR); Jung-Yeob Oh, Seongnam-si (JP)

(73) Assignee: Samsung Electronics Co., Ltd (KR)

( * ) Notice: Subject to any disclaimer, the term of this patent is extended or adjusted under 35 U.S.C. 154(b) by 12 days.

(21) Appl. No.: 11/483,486

(22) Filed: Jul. 10, 2006

(65) Prior Publication Data

US 2007/0008827 A1    Jan. 11, 2007

(30) Foreign Application Priority Data

Jul. 8, 2005    (KR) ...................... 10-2005-0061668

(51) Int. Cl.
*G04B 47/00*    (2006.01)
(52) U.S. Cl. .......................................... 368/73; 368/13
(58) Field of Classification Search .................. 368/10, 368/12, 72, 73, 13, 41, 74, 250, 251, 261; 700/14–18
See application file for complete search history.

(56) References Cited

U.S. PATENT DOCUMENTS

| | | | | |
|---|---|---|---|---|
| 5,008,866 A | * | 4/1991 | Thinesen | ...................... 368/21 |
| 5,995,454 A | * | 11/1999 | Yamaki | ........................ 368/10 |
| 6,631,271 B1 | * | 10/2003 | Logan | ...................... 455/456.1 |
| 6,996,402 B2 | * | 2/2006 | Logan et al. | .............. 455/456.1 |
| 7,109,848 B2 | * | 9/2006 | Schybergson | ............. 340/309.7 |
| 2003/0080116 A1 | * | 5/2003 | Williamson | .................. 219/719 |
| 2003/0084047 A1 | * | 5/2003 | Williamson | ................... 707/10 |
| 2005/0058026 A1 | * | 3/2005 | Hocherman | ................... 368/73 |
| 2005/0105396 A1 | * | 5/2005 | Schybergson | ................. 368/12 |
| 2005/0174889 A1 | * | 8/2005 | Marcantonio et al. | .......... 368/12 |
| 2007/0133876 A1 | * | 6/2007 | Chande et al. | ............... 382/181 |

FOREIGN PATENT DOCUMENTS

KR    1998-84987    12/1998

* cited by examiner

*Primary Examiner*—Vit W Miska
*Assistant Examiner*—Sean Kayes
(74) *Attorney, Agent, or Firm*—The Farrell Law Firm, LLP

(57) ABSTRACT

A method for setting an alarm in a mobile communication terminal. Different alarm times can be set for different alarm days according to an alarm time and an alarm day set in each of a plurality of alarm setting formats. An alarm setting table including the plurality of alarm setting formats is displayed and edited on a screen, thereby simplifying an alarm setting process and allowing a user to conveniently check entire alarm information.

6 Claims, 4 Drawing Sheets

METHOD FOR SETTING ALARM IN MOBILE COMMUNICATION TERMINAL

PRIORITY

This application claims priority under 35 U.S.C. § 119 to an application entitled "Method for Setting Alarm in Mobile Communication Terminal" filed in the Korean Intellectual Property Office on Jul. 8, 2005 and assigned Ser. No. 2005-61668, the contents of which are incorporated herein by reference.

BACKGROUND OF THE INVENTION

1. Field of the Invention

The present invention generally relates to a mobile communication terminal and in particular, to a method for setting an alarm in a mobile communication terminal.

2. Description of the Related Art

Generally, in a method for setting an alarm in a mobile communication terminal, a user selects a desired day of the week among the days displayed by the mobile communication terminal; sets an alarm time, an alarm sound, the number of alarms generated; and adds another alarm by repeating the foregoing alarm setting operation. In other words, in a conventional alarm setting process, users can set an alarm for each day of the week, but they must repeat the same alarm setting process for each day of the week.

For example, when a user works in the morning on Monday, Wednesday, and Friday and in the afternoon on Tuesday, Thursday, and Saturday, an alarm may be set to 6:00 AM for Monday, Wednesday, and Friday and to 9:00 AM for Tuesday, Thursday, and Saturday. Thus the set alarm can be suitable for a user's life pattern. If the user's work pattern is changed such that the user works in the morning on Monday through Wednesday and in the afternoon on Thursday through Saturday, the initial alarm setting corresponding to Tuesday and Friday should be changed or should be canceled and then reset. As such, the conventional alarm setting process causes users to repeat the same operation and to experience the burden of changing existing set values.

SUMMARY OF THE INVENTION

It is, therefore, an object of the present invention to provide a method for setting an alarm, in which a user can conveniently set an alarm independently in a mobile communication terminal.

It is another object of the present invention to provide a method for setting an alarm, in which a user can conveniently set an alarm for each day of the week in a mobile communication terminal.

It is further another object of the present invention to provide a method for setting an alarm, in which an alarm setting or changing process can be simplified when a user sets or changes an alarm for each day of the week.

To achieve the above and other objects, there is provided a method for setting an alarm of a mobile communication terminal. The method includes displaying an alarm setting table comprised of a plurality of alarm setting formats in an alarm setting mode; activating an alarm setting format selected from the plurality of alarm setting formats by a user; and setting an alarm in the activated alarm setting format.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Preferred embodiments of the present invention will now be described in detail with reference to the annexed drawings. In the following description, a detailed description of known functions and configurations incorporated herein has been omitted for conciseness.

Figure 1:
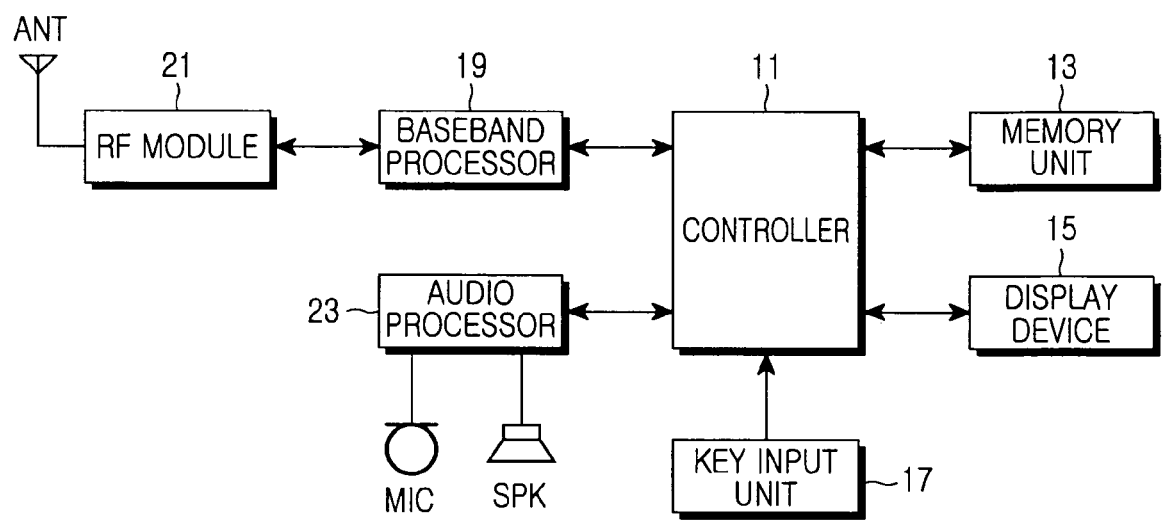
FIG. 1 is a block diagram of a mobile communication terminal to which the present invention is applied.

The configuration of a mobile communication terminal to which the present invention is applied will be described with reference to FIG. 1. Referring to FIG. 1, the mobile communication terminal includes a controller 11, a memory unit 13, a display device 15, a key input unit 17, a baseband processor 19, a radio frequency (RF) module 21, and an audio processor 23.

The controller 11 controls the overall operation of the mobile communication terminal.

The display device 15 displays various image information and images that are received from a base station or stored in the memory unit 13 on a screen under the control of the controller 11.

The key input unit 17 includes a *-key, a #-key, various function keys such as a Menu key, a Selection key, a Call key, a Cancel key, an End key, a Volume key, and a Photography key corresponding to various functions of the mobile communication terminal and provides key input data corresponding to a key pressed by a user to the controller 11. The key input unit 17 includes character keys that are assigned numbers 0 through 9 and a plurality of Korean and English alphabets.

The RF module 21 transmits and receives a radio signal to/from a base station through an antenna ANT. For signal transmission, the RF module 21 modulates a transmission signal input from the controller 11 through the baseband processor 19 into a radio frequency (RF) signal, and transmits the RF signal through the antenna ANT. For signal reception, the RF module 21 demodulates an RF signal received through the antenna ANT and provides the demodulated RF signal to the controller 11. The baseband processor 19 processes a baseband signal transmitted and received between the RF module 21 and the controller 11.

The audio processor 23 connected to the controller 11, and a microphone MIC and a speaker SPK, both connected to the audio processor 23, are used for calling and voice recording.

The memory unit 13 stores a program for processing and controlling the controller 11, reference data, and various reserved data that can be updated and is provided as a working memory of the controller 11. The memory unit 13 also stores program data relating to an alarm setting process, a setting option menu, and a plurality of alarm setting formats, and an alarm setting table comprised of the plurality of alarm setting formats.

The alarm setting format is an interface provided to a user when an alarm time and an alarm day are changed or set. The alarm setting format includes activation state information, alarm time information, and alarm day information and may be comprised of an activation state display region, an alarm time display region, and an alarm day display region.

The activation state display region displays an activation state of a corresponding alarm setting format. The activation of an alarm setting format means that an alarm is set to a time corresponding to an alarm time and an alarm day included in the alarm setting format and the alarm rings at the designated time.

An alarm time selected by a user is displayed in the alarm time display region. An alarm day selected by the user is displayed in the alarm day display region.

The alarm setting table shows an alarm setting state of a mobile communication terminal and may include the plurality of alarm setting formats stated above.

The setting option menu is a menu for setting additional options associated with an alarm. The additional options include an alarm sound type, whether to repeat an alarm, the number of repetitions of the alarm, and an alarm repetition interval. The setting option menu may be set for the alarm setting formats according to an embodiment of the present invention.

An operation of the mobile communication terminal according to the present invention is as follows. If an alarm time setting mode is set according to a user's selection, the controller 11 of the mobile communication terminal displays an alarm setting table and a setting option menu. If the user selects one of a plurality of non-activated alarm setting formats constituting the alarm setting table and requests the activation of the selected one, the controller 11 activates the selected alarm setting format. The user then selects the activated alarm setting format to input an alarm time and select an alarm day. At this time, the user may set at least one day-of-the-week as the alarm day. The controller 11 sets the input alarm time for the alarm day selected by the user and displays the set alarm time and alarm day in corresponding display regions of the alarm setting format, thereby providing the user with information about the set alarm time and all alarm days for which the alarm time is set. The user can set an alarm sound of an alarm set by the selected alarm setting format, the number of repetitions of the alarm, and an alarm repetition interval of the alarm using a displayed setting option menu. The controller 11 sets the alarm sound, the number of repetitions of the alarm, and the alarm repetition interval according to user's setting for the selected alarm setting format.

The user may then activate another non-activated alarm setting format or select another already-activated alarm setting format to set a non-selected day-of-the-week as an alarm day and set a new alarm time for the set alarm day. At this time, if the user sets an already selected day-of-the-week as an alarm day again, the controller 11 cancels an alarm time that is previously set for the set alarm day and sets an alarm time that is set by the selected alarm setting format as an alarm time for the set alarm day.

An operation associated with alarm time setting of the mobile communication terminal will be described with reference to the flowcharts of FIGS. 2A and 2B. FIG. 3 illustrates displayed screens according to an embodiment of the present invention.

Figure 2A:
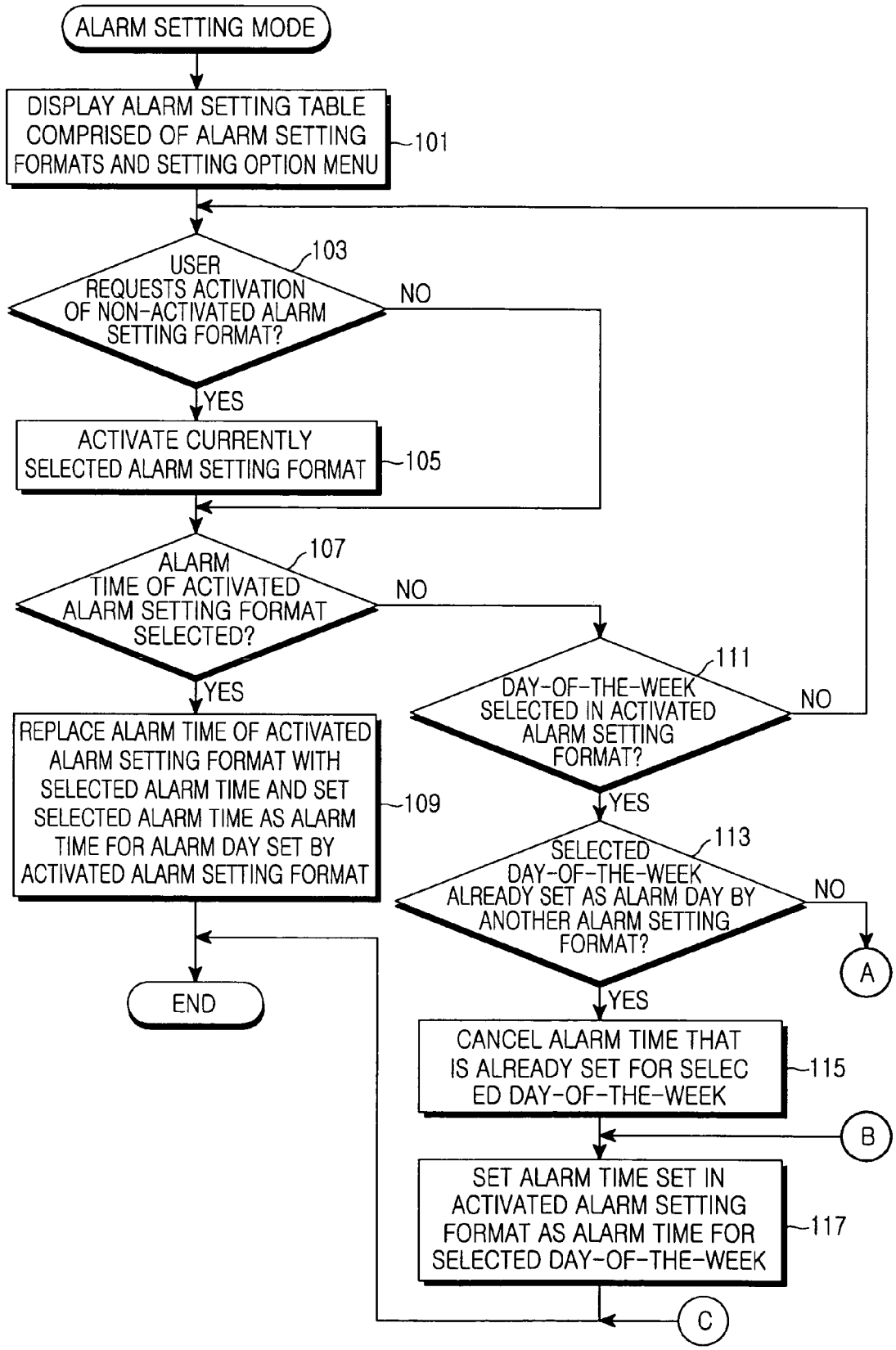
FIGS. 2A and 2B are flowcharts illustrating an operation of a mobile communication terminal according to an embodiment of the present invention.
Figure 2B:
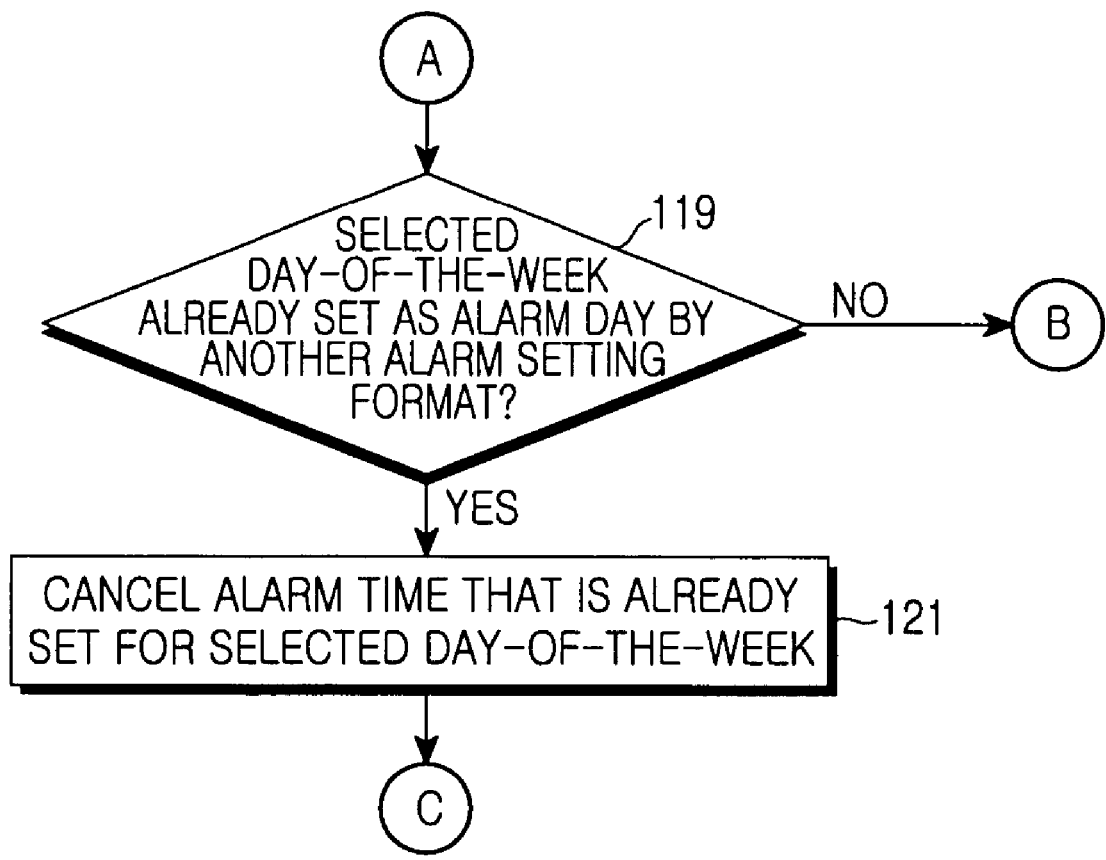
Figure 3:
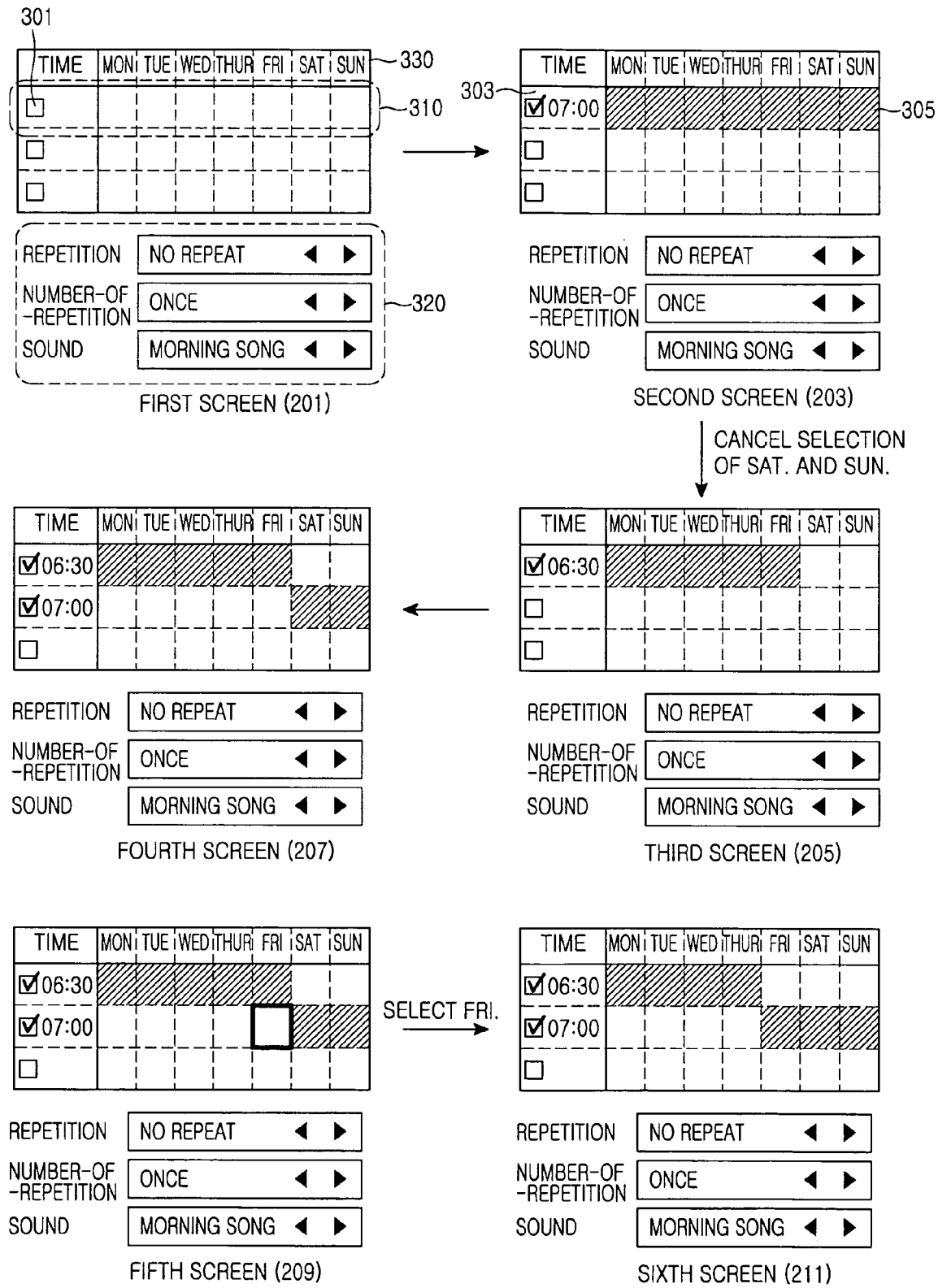
FIG. 3 illustrates displayed screens according to an embodiment of the present invention.

Referring to FIG. 2A, the controller 11 displays an alarm setting table comprised of a plurality of alarm setting formats and a setting option menu as a first screen 201 of FIG. 3 in step 101 and goes to step 103. In the first screen 201, an alarm setting table 330 comprised of a plurality of alarm setting formats 310 and a setting option menu 320 are displayed according to an embodiment of the present invention. An activation state display region 301 of the alarm setting format 310 according to an embodiment of the present invention is implemented as a check box. An alarm day display region 305 is implemented as a box corresponding to each day-of-the-week. If a day-of-the-week is set as an alarm day, a color of or a depth of shading of a box corresponding to the set alarm day is changed. In an alarm time display region 303, a time representation corresponding to a time input from a user is displayed. The setting option menu 320 includes a repetition menu for determining whether to repeat an alarm, a number-of-repetitions menu for setting the number of repetitions of the alarm, and a sound menu for setting an alarm sound.

Referring back to FIG. 2A, the controller 11 goes to step 105 if the user requests activation of a non-activated alarm setting format in step 103. If the user does not request activation of a non-activated alarm setting format in step 103, the controller 11 goes to step 107. In step 105, the controller 11 activates a currently selected alarm setting format and goes to step 107. The controller 11 goes to step 109 if the user inputs an alarm time to an activated alarm setting format. If the user does not input an alarm time in step 107 to an activated alarm setting format, the controller 11 goes to step 111. In step 109, the controller 11 replaces an alarm time of the activated alarm setting format with the alarm time input by the user, sets the input alarm time as an alarm time for an alarm day set in the activated alarm setting format, and goes to the END.

In step 111 the controller 11 checks if the user inputs a selection of a day-of-the-week of the activated alarm setting format. If the user inputs a selection of a day-of-the-week, the controller goes to step 113. If the user does not input a selection of a day-of-the-week, the controller returns to step 103. In step 113, the controller 11 checks if a day-of-the-week selected by the user in step 111 is already set as an alarm day by another alarm setting format. If the selected day-of-the-week is set as an alarm day by another alarm setting format, the controller goes to step 115. Unless the selected day-of-the-week is set as an alarm day by another alarm setting format, the controller goes to A for step 119 of FIG. 2B. In step 119 of FIG. 2B, the controller 11 checks if the day-of-the-week selected by the user in step 111 is set as an alarm day by another alarm setting format, i.e., a currently edited and set alarm setting format. If the selected day-of-the-week is set as an alarm day, the controller 11 goes to step 121. Unless, in step 119, the selected day-of-the-week is set as an alarm day in another alarm format, the controller 11 goes to B for step 117 of FIG. 2A. In step 117, the controller 11 sets the alarm time set in the alarm setting format as the alarm time for the selected day-of-the-week and goes to END. In other words, if the day-of-the-week selected by the user in step 111 is in a wait state where it is not set as an alarm day by any alarm setting format, the controller 11 sets the selected day-of-the-week as an alarm day of the currently edited alarm setting format and sets an alarm time set in the currently edited alarm setting format as the alarm time for the selected day-of-the-week. At this point in the procedure, a screen such as the second screen 203 of FIG. 3 may be displayed. In the second screen 203, an alarm time is set to 7:00 AM in the first alarm setting format 310 of the alarm setting table 330 and all the days-of-the-week from Monday to Sunday are set as alarm days.

In step 121, since the day-of-the-week selected in step 111 is already set as an alarm day by another alarm time format, i.e., the currently edited alarm setting format, the controller 11 cancels the set alarm time for the selected-day-of-the-week, resets the selected-day-of-the-week to a wait state, and goes to C of FIG. 2A. For example, referring to FIG. 3, in the second screen 203, if Saturday and Sunday are selected in the first alarm setting format 310, the setting of Saturday and Sunday as alarm days is canceled and the screen is displayed as a third screen 205. At this point, an alarm time can also be changed as in the third screen 205 by performing steps 107 and 109. Thereafter, the user may activate a new alarm setting format 310 to set another alarm as in a fourth screen 207 by performing processes stated above. Alternatively, when a non-activated alarm setting format is activated, a day-of-the-week that is not set as an alarm day may be automatically set as an alarm day. Thus, when the screen is changed from the third screen 205 to the fourth screen 207, Saturday and Sunday in a wait state may be automatically set as alarm days without user's selection when the alarm setting format 310 is activated.

If the day-of-the-week selected in step 111 is already set as an alarm day by another alarm setting format, the controller 11 cancels an already set alarm time for the selected-day-of-the-week in step 115, goes to step 117 for setting an alarm time set by the currently edited alarm setting format as an alarm time for the selected day-of-the-week, and goes to END. Referring to the fifth screen 209 and the sixth screen 211, for example, when the user desires to set Friday that is already set as an alarm day by the first alarm setting format 310 as an alarm day of the second alarm setting format 310, the controller 11 cancels setting of the alarm day by the first alarm setting format 310, sets Friday as the alarm day by the second alarm setting format 310, and sets an alarm time for Friday to 7:00 AM that is the alarm time set by the second alarm setting format 310.

Various alarms may be set by repeating steps 101 through 121. Although not shown in figures, by changing the setting option menu 320 when the alarm setting format 310 is changed, an alarm sound type, whether to repeat an alarm, and the number of repetitions of an alarm may be changed. In addition, the setting options may be set for each alarm day.

As described above, according to the present invention, different alarm times can be set for different alarm days according to an alarm time and an alarm day set in each of a plurality of alarm setting formats. An alarm setting table including the plurality of alarm setting formats is displayed and edited on a screen, thereby simplifying an alarm setting process and allowing a user to conveniently check the entire alarm information.

Default values for alarm times and alarm days may be applied when an alarm setting format is initially activated, but the alarm time and the alarm day have not yet been set by the user. Further, the default value for alarm days may include all the days of the week. Also, a plurality of alarm times may be set for one day according to a user's request.

While the invention has been shown and described with reference to certain preferred embodiments thereof, it will be understood by those skilled in the art that various changes in form and details may be made therein without departing from the spirit and scope of the invention.

What is claimed is:

1. A method for setting an alarm of a mobile communication terminal, the method comprising:
    displaying an alarm setting table including a plurality of alarm setting formats in an alarm setting mode;
    activating at least one alarm setting format selected from the plurality of alarm setting formats by a users,
    wherein each alarm setting format is a user-interface including one alarm time display region displaying one user-selectable alarm time and an alarm day display region displaying at least one alarm day, and
    wherein the alarm day display region has respective regions corresponding to a plurality of user-selectable days-of-the-week corresponding to the one alarm time; and
    setting the alarm time and an alarm day in the activated alarm setting format in response to input from the user and setting the alarm in response to the alarm setting format;
    wherein the step of setting an alarm time and an alarm day in the activated alarm setting format comprises:
    setting a time input by the user as an alarm time;
    checking whether a day-of-the-week selected by the user is already set as an alarm day;
    if the selected day-of-the-week is not yet set as an alarm day, setting the selected day-of-the-week as the alarm day;
    if the selected day-of-the-week is already set as an alarm day by the activated alarm setting format that is currently being edited, canceling the alarm day setting; and
    if the selected day-of-the-week is set as the alarm day by another setting format, canceling an alarm time set by the other setting format for the selected day-of-the-week, and setting an alarm time set by the currently edited alarm setting format as an alarm time for the selected day-of-the-week, thereby setting the selected day-of-the-week as an alarm day.

2. The method of claim 1, wherein a plurality of alarm times may be set for one alarm day according to a user's input.

3. The method of claim 2, wherein when the alarm table is displayed, the alarm time display region and the alarm day display region are visibly displayed.

4. The method of claim 1, further comprising the step of setting an alarm sound type, whether to repeat an alarm, a number of repetitions of the alarm, and an alarm repetition interval according to a user input in the activated alarm setting format.

5. The method of claim 1, wherein when the alarm setting table is displayed, detailed information of the plurality of alarm setting formats is also displayed.

6. A method for setting an alarm of a mobile communication terminal, the method comprising:
    displaying an alarm setting table comprised of a plurality of alarm time setting formats in an alarm setting mode, each alarm time setting format is a user-interface including one alarm time display region displaying one user-selectable alarm time, an alarm day display region having sub-regions corresponding to days-of-the-week, each day-of-the-week corresponding to the one alarm time to indicate whether a corresponding day-of-the-week is set as an alarm day corresponding to the one alarm time, and an activation state display region;
    activating at least one alarm setting format selected from the plurality of alarm setting formats by a user;
    selecting an activated alarm format according to a user's request;
    setting a time input by the user as the alarm time of the selected activated alarm format;
    setting a day-of-the-week selected by the user as an alarm day of the selected activated alarm setting format if the selected day-of-the-week is not yet set as an alarm day by the selected activated alarm setting format or another activated alarm setting format;
    canceling the alarm day setting if the selected day-of-the-week is already set as an alarm day by the activated alarm setting format that is currently being edited, canceling an alarm time set by another setting format for the selected day-of-the-week if the selected day-of-the-week is set as an alarm day by another activated setting format;
    setting an alarm time set by the currently edited alarm setting format as an alarm time for the selected day-of-the-week if the selected day-of-the-week is not yet set as an alarm day by another setting format, thereby setting the selected day-of-the-week as an alarm day; and
    setting an alarm corresponding to the activated alarm time setting format.

* * * * *